US011919161B2

(12) United States Patent
Fan

(10) Patent No.: US 11,919,161 B2
(45) Date of Patent: Mar. 5, 2024

(54) GRASP GENERATION FOR MACHINE TENDING

(71) Applicant: FANUC CORPORATION, Yamanashi (JP)

(72) Inventor: Yongxiang Fan, Union City, CA (US)

(73) Assignee: FANUC CORPORATION, Yamanashi (JP)

( * ) Notice: Subject to any disclaimer, the term of this patent is extended or adjusted under 35 U.S.C. 154(b) by 231 days.

(21) Appl. No.: 17/502,230

(22) Filed: Oct. 15, 2021

(65) Prior Publication Data

US 2023/0124599 A1    Apr. 20, 2023

(51) Int. Cl.
*G06F 18/24*    (2023.01)
*B25J 9/16*    (2006.01)
(Continued)

(52) U.S. Cl.
CPC .......... *B25J 9/1612* (2013.01); *B25J 9/1671* (2013.01); *B25J 9/1697* (2013.01); *B25J 19/023* (2013.01); *G06F 18/24147* (2023.01); *G06T 7/50* (2017.01); *G06T 2207/10028* (2013.01)

(58) Field of Classification Search
CPC ...... B25J 9/1612; B25J 9/1671; B25J 9/1697; B25J 19/023; B25J 9/1669; B25J 9/00; B25J 9/16; B25J 9/0081; B25J 9/0093; B25J 9/1605; B25J 9/163; B25J 9/1653; B25J 9/1656; B25J 9/1661; B25J 9/1664; B25J 9/1679; B25J 9/1684; B25J 13/089; B25J 15/0009; B25J 9/0028; B25J 19/021; G06F 18/24147; G06T 7/50;
(Continued)

(56) References Cited

U.S. PATENT DOCUMENTS 9,477,307 B2 * 10/2016 Chizeck .................. G06T 15/04
9,669,543 B1 *  6/2017 Stubbs .................... B25J 9/1612
(Continued)

OTHER PUBLICATIONS

Dikov, "Least-Squares Method to Estimate the Cost Function," Sep. 16, 2019 (Year: 2019).*
(Continued)

*Primary Examiner* — Jonathan L Sample
*Assistant Examiner* — Byron Xavier Kasper
(74) *Attorney, Agent, or Firm* — John A. Miller; Shumaker, Loop & Kendrick, LLP

(57) ABSTRACT

A robotic grasp generation technique for machine tending applications. Part and gripper geometry are provided as inputs, typically from CAD files. Gripper kinematics are also defined as an input. Preferred and prohibited grasp locations on the part may also be defined as inputs, to ensure that the computed grasp candidates enable the robot to load the part into a machining station such that the machining station can grasp a particular location on the part. An optimization solver is used to compute a quality grasp with stable surface contact between the part and the gripper, with no interference between the gripper and the part, and allowing for the preferred and prohibited grasp locations which were defined as inputs. All surfaces of the gripper fingers are considered for grasping and collision avoidance. A loop with random initialization is used to automatically compute many hundreds of diverse grasps for the part.

22 Claims, 5 Drawing Sheets

(51) Int. Cl.
  *B25J 19/02*   (2006.01)
  *G06F 18/2413*   (2023.01)
  *G06T 7/50*   (2017.01)
  *G06V 20/64*   (2022.01)

(58) Field of Classification Search
  CPC ... G06T 2207/10028; G06T 7/60; G06T 7/62; G06V 20/647; G06V 20/60; G06V 20/64; G06V 20/653; G05B 2219/33077
  See application file for complete search history.

(56) References Cited

U.S. PATENT DOCUMENTS

| | | | | |
|---|---|---|---|---|
| 11,494,632 | B1* | 11/2022 | Bai | G06N 3/09 |
| 2007/0213874 | A1* | 9/2007 | Oumi | B25J 9/1697 |
| | | | | 700/245 |
| 2018/0232052 | A1* | 8/2018 | Chizeck | G06T 7/97 |
| 2018/0282066 | A1* | 10/2018 | Wagner | B25J 9/1615 |
| 2019/0001508 | A1* | 1/2019 | Li | G05B 13/041 |
| 2019/0152055 | A1* | 5/2019 | Abe | B25J 9/163 |
| 2020/0122321 | A1* | 4/2020 | Khansari Zadeh | B25J 9/1664 |
| 2021/0122039 | A1* | 4/2021 | Su | B25J 13/084 |
| 2021/0122045 | A1* | 4/2021 | Handa | G06T 7/74 |
| 2021/0229281 | A1* | 7/2021 | Natarajan | B25J 9/1669 |

OTHER PUBLICATIONS

Song et al., "Grasp planning via hand-object geometric fitting," Nov. 7, 2016 (Year: 2016).*

Hammond et al., "Towards a design optimization method for reducing the mechanical complexity of underactuated robotic hands," Jun. 28, 2012 (Year: 2012).*

* cited by examiner

GRASP GENERATION FOR MACHINE TENDING

BACKGROUND

Field

The present disclosure relates generally to a method for generating quality grasp data for robot grasping of parts and, more particularly, to a method for robot grasp generation for machine tending applications in which part and gripper geometry and provided as inputs, user definition of preferred and prohibited grasp locations on the part is available, an optimization solver is used to compute a quality grasp with surface contact between the part and the gripper, and a random initialization is used to provide many hundreds of diverse grasps for the part.

Discussion of the Related Art

The use of industrial robots to perform a wide range of manufacturing, assembly and material movement operations is well known. One such application is a pick and place operation, such as where a robot picks up individual parts from a bin and places each part at a prescribed location for further processing or packaging. A specific example of a pick and place operation is the machine tending application, where parts which have been molded or machined are dropped into the bin and need to be grasped by the robot and placed into a machining station. The machining station may be open or fully enclosed with automated doors, and the machining station must typically grasp the part in a particular manner in order to allow the machining operations (drilling, milling, thread tapping, etc.) to be performed on the part.

In applications such as described above, a vision system (one or more cameras) is typically used to identify the position and orientation of individual parts in the bin. Then a specific robotic grasp is identified to be used on a selected part, where the grasp may be chosen from a pre-computed database of grasps which have been generated for the particular part geometry and the particular gripper geometry.

Because of the specific grasping requirements of the machining station, the corresponding robotic grasp generation has traditionally been done manually. In this type of manual teaching, a production robot and machining station are used, and an expert operator uses either a teach pendant or hand guidance to teach the robot to grasp the part. This must be done many times in order to define suitable grasps for the part in many different orientations in the bin. This manual teaching technique is slow and inefficient, and also very costly because it requires a full workcell (with robot and machining station) for teaching, which in turn prevents the workcell from being used for actual part production.

Other grasp generation techniques are known which can automatically generate many grasp candidates. However, these techniques have downsides such as being extremely computationally expensive and slow, or making simplifications which result in computed grasps of low grasp quality. In addition, existing techniques have no automated way of accounting for the fact that the robot must grasp the part such that the part can be loaded into and grasped by the machining station.

In light of the circumstances described above, there is a need for a robot grasp generation technique which computes high quality grasp candidates without manual teaching, is computationally efficient, and provides stable grasps which are compatible with the specific grasping and orientation requirements of a robot tending a machining station.

SUMMARY

In accordance with the teachings of the present disclosure, a robotic grasp generation technique for machine tending applications is presented. Part and gripper geometry are provided as inputs, typically from CAD files. Gripper kinematics are also defined as an input. Preferred and prohibited grasp locations on the part may also be defined as inputs, to ensure that the computed grasp candidates enable the robot to load the part into a machining station such that the machining station can grasp a particular location on the part. An optimization solver is used to compute a quality grasp with stable surface contact between the part and the gripper, with no interference between the gripper and the part, and allowing for the preferred and prohibited grasp locations which were defined as inputs. All surfaces of the gripper fingers are considered for grasping and collision avoidance. A loop with random initialization is used to automatically compute many hundreds of diverse grasps for the part.

Additional features of the presently disclosed methods will become apparent from the following description and appended claims, taken in conjunction with the accompanying drawings.

DETAILED DESCRIPTION OF THE EMBODIMENTS

The following discussion of the embodiments of the disclosure directed to a robotic grasp generation technique for machine tending applications is merely exemplary in nature, and is in no way intended to limit the disclosed techniques or their applications or uses.

The use of industrial robots for picking parts from a source and placing them at a destination is well known. In a typical pick and place operation, a supply of parts is provided in a bin, such as a bin containing a random pile of parts which have just been cast or molded, where the parts need to be picked up from their random poses in the bin and placed in a particular pose at a destination location. Machine tending is a particular type of robotic part picking and placement having unique requirements, discussed below.

Figure 1:
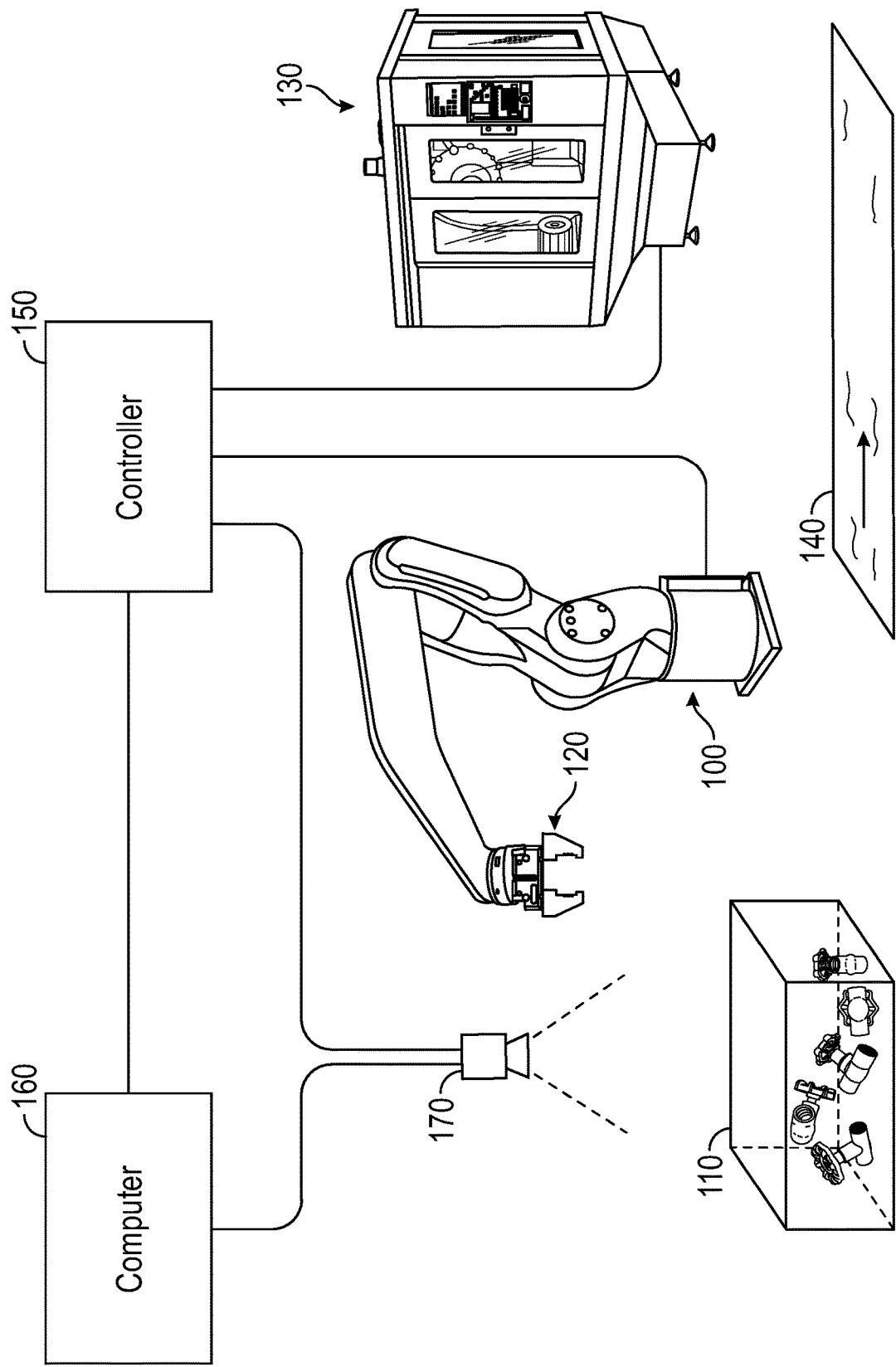
FIG. 1 is an illustration of a robotic machine tending system, where an industrial robot picks a raw part from a bin and places the raw part in a machining station for processing, then removes the finished part from the machining station after processing.

FIG. 1 is an illustration of a robotic machine tending system, where an industrial robot 100 picks a raw part from a bin 110 and places the raw part in a machining station 130 for processing, then removes the finished part from the machining station 130 after processing. The robot 100 places the finished parts on a conveyor 140 where they are carried away for further processing or packaging. The robot 100 has a gripper 120 which may be designed with a finger shape which is selected based on the shape of the parts which are being handled by the robot 100. The gripper finger shape is discussed further below.

Motion of the robot 100 is controlled by a controller 150, which typically communicates with the robot 100 via a cable. The controller 150 provides joint motion commands to the robot 100 and receives joint position data from encoders in the joints of the robot 100, as known in the art. The controller 150 also provides commands to control operation of the gripper 120 (grip/ungrip commands and width).

A computer 160 is in communication with the controller 150. The computer 160 includes a processor and memory/storage, and runs an algorithm configured to compute a high quality grasp for a part in the bin 110 based on images and data from at least one three dimensional (3D) camera 170. The 3D camera 170 is typically a 3D camera providing both color image data and pixel depth map data, but may be some other type of 3D sensor which provides data suitable for determining the pose (position and orientation) of parts in the bin 110. More than one of the 3D cameras 170 may be used to provide more robust depth and image data which aids in part pose determination, and also allows for non-vertical gripper approach angles. In some applications, the bin 110 may contain only one part, which could be in any position and orientation. This would be the case if the parts are processed by the machining station 130 at the same rate that they arrive in the bin 110. Alternately, the bin 110 may contain several parts (as shown in FIG. 1), or a substantial pile of parts. In any case, a best quality grasp candidate is determined from the image data from the camera 170.

The computer 160 provides the target grasp data to the controller 150, which controls the robot 100 and the gripper 120 to grasp a part from the bin 110. The target grasp data includes the grasp target point (x/y/z coordinates), the approach angle to be followed by the gripper 120, and the gripper angle of rotation and width. Using the grasp data, the controller 150 can compute robot motion instructions which cause the gripper 120 to grasp a part and move the part into the machining station 130. Alternately, the 3D camera(s) 170 may provide images to the controller 150 which would compute the part grasp directly. In any case, grasp generation is performed in advance (providing a database of many different stable grasps); the grasp generation is the subject of the present disclosure, and is discussed in detail below.

The controller 150 is also in communication with the machining station 130. The machining station 130 may have its own controller, or the controller 150 may control all of the operations of the machining station 130, including door opening/closing, part grasping and ungrasping, lubricant flow control, machining operations, etc. At a minimum, the controller 150 communicates sufficiently with the machining station 130 to allow the loading and unloading of parts by the robot 100. That is, when the machining station 130 is ready for a new part to be loaded, the controller 150 commands the robot to grasp a part from the bin 110 and place the part in the grasping tool of the machining station 130 in the prescribed orientation. The robot 100 then withdraws from the machining station 130 and waits for the machining operations to be completed on the part. When the machining station 130 signals to the controller 150 that the finished part is ready to be removed from the machining station 130, the robot 100 reaches into the machining station 130 and grasps the part (which is in a known pose), the machining station 130 ungrasps the part, and the robot 100 moves the part to the conveyor 140. The conveyor 140 is merely exemplary; the robot 100 may place the finished part in another bin, in a shipping container or elsewhere after removal from the machining station 130. After dropping off the finished part, the robot 100 then returns to the bin 110 to select another raw part to load into the machining station 130. The next raw part grasp is determined based on new image data provided by the 3D camera(s) 170.

Teaching a robot to recognize and grasp an individual part in a bin full of parts, in real time, has always been challenging. In order to improve the speed and reliability of robotic part picking operations, it is known to pre-compute grasps for a specified gripper grasping a particular part in a variety of poses. This pre-computing of grasps is known as grasp generation, and the pre-computed (generated) grasps are then used to make decisions in real time during robotic part picking operations.

Traditional grasp generation methods manually teach picking points on known 3D features on objects. These methods require significant time spent on heuristics design in order to identify the best grasp poses, and these manually designed heuristics may not work on unknown objects or occlusions. Because of the difficulties of using heuristics grasp teaching, learning-based grasp detection methods have become popular due to their ability to adapt to unknown objects.

However, existing learning-based grasp generation methods also have downsides. One known learning-based technique uses a mathematically rigorous grasp quality to search for grasp candidates before feeding these candidates to a convolutional neural network (CNN) classifier, but is computationally expensive, and the solution may not be optimal in real world situations due to simplifications used in the optimization. Another method uses empirical trials to collect data producing realistic grasps, but this method usually requires tens of thousands of robot hours with complicated force controls, and any change of the gripper requires a repeat of the whole process. In general, learning-based grasp generation methods produce many grasps which may fail in real world conditions, and learning-based methods generally cannot accommodate user grasp region preferences.

The present disclosure describes a grasp generation technique which can be automatically applied to any combination of gripper and part designs, produces a large number of realistic grasps in an efficient optimization computation, and can also simulate the physical act of grasping an individual part from a pile of parts jumbled together in a bin as is often encountered in real world robotic part picking operations. To increase the robustness of the grasps, a mathematically rigorous grasp quality is used, and the contacts are modeled as surfaces. A specially designed optimization routine is used to solve the computations efficiently. The optimization routine includes user identification of preferred and prohibited grasp locations on the part, to allow the part to be handed off to a machining station. The advance generation of the database of quality grasps enables the computer 160

(or the controller 150) to perform the real-time grasp computations quickly and efficiently during actual robotic machine tending operations.

Figure 2:
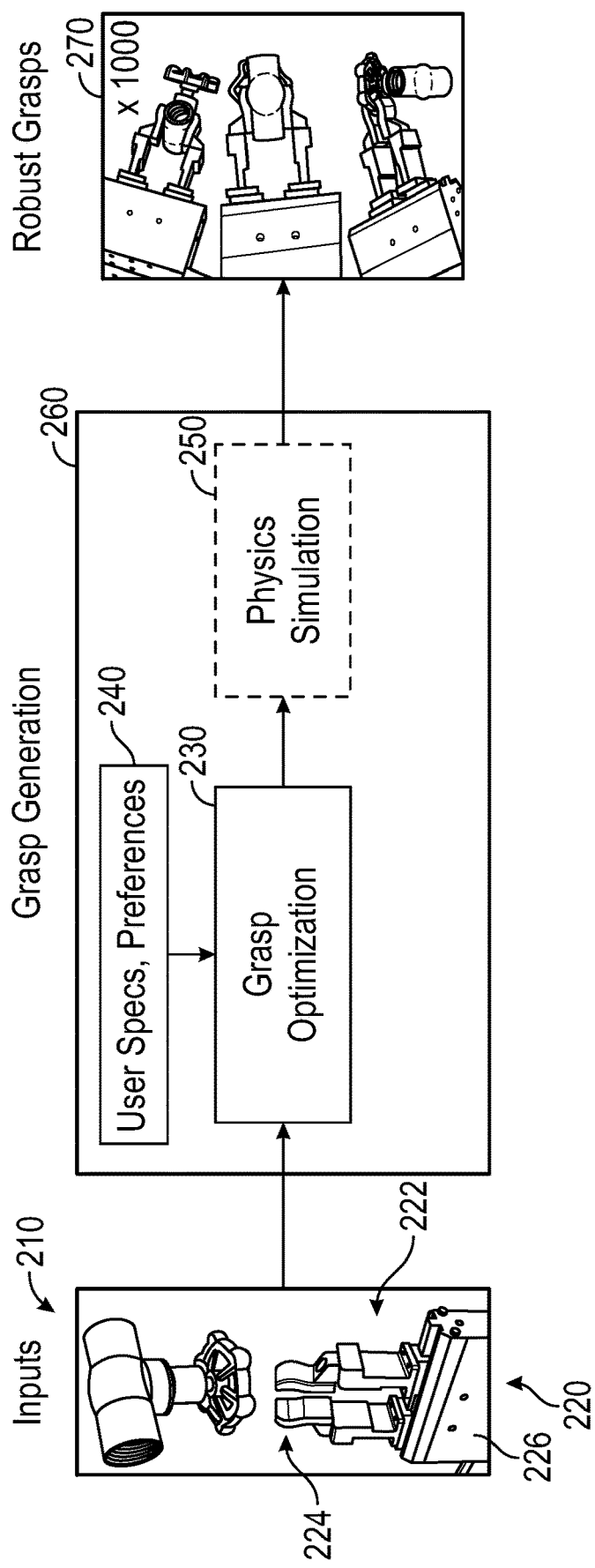
FIG. 2 is an illustrated flowchart diagram of steps included in a grasp generation process used to create a grasp database which in turn is used in the machine tending system of FIG. 1, according to an embodiment of the present disclosure.

FIG. 2 is an illustrated flowchart diagram 200 of steps included in a grasp generation process used to create a grasp database which is in turn used in the machine tending system of FIG. 1, according to an embodiment of the present disclosure. Inputs to the grasp generation process include a part model 210 and a gripper model 220. The part model 210 is a 3D surface or solid model of the part which is to be picked from the bin 110 by the robot 100 (of FIG. 1). The part model 210 is typically created in a computer aided design (CAD) system. The part model 210 shown in FIG. 2 depicts a pipe valve which is used as the part throughout the present disclosure.

The gripper model 220 includes surface or solid shape data for gripper fingers 222. The gripper model 220 illustrates a two-finger parallel gripper, however, other types of gripper designs may be used. The gripper fingers 222 include finger tips 224 having a concave shape which is selected to correspond with the part (the pipe valve) which is being grasped by the robot. That is, the finger tips 224 can produce a stable grasp on many different parts of the pipe valve—such as the handle, the coupling body, the valve stem throat, etc. Different grippers having different designs of the finger tips 224 may be employed based on the shape of the part being grasped.

The gripper model 220 also includes a finger grasp width, which is the distance that the fingers 222 are separated by a gripper actuator 226. The grasp width may be commanded by the controller 150 to increase before part grasping and to decrease to grasp the part. The mounting orientation of the actuator 226 on the wrist of the robot 100 is known, which means that the translational axis of the fingers 222 relative to the actuator 226 is known, which in turn enables the locations of the finger tips 224 in space to be computed based on the grasp width.

The part model 210 and the gripper model 220 are provided to a grasp optimization box 230 which calculates the large number of diverse grasps based on the part model 210 and the gripper model 220. Also provided as input to the grasp optimization box 230 are user specifications and preferences 240. In a preferred embodiment of the method, the user specifications and preferences 240 include a number of grasps to be computed (such as 1000, for example), and optional preferred and prohibited grasp regions on the part model 210. The preferred grasp regions indicate certain portions of the part where a robot grasp is desirable, while the prohibited grasp regions indicate certain portions of the part where a robot grasp is not allowed. The preferred and prohibited grasp regions do not both need to be used. In one example, only a prohibited grasp region is defined, where the prohibited grasp region is defined as a location on the part (such as the pipe coupling junction of the pipe valve) where the part is grasped by the machining station 130, and thus cannot be grasped by the robot 100. The grasp optimization box 230 calculates a large number of diverse grasps, where each grasp includes an approach direction, target grasp coordinates, and gripper angle and width. Details of the calculations performed in the grasp optimization box 230 are discussed below.

The grasp optimization box 230 provides its output (a large number of quality grasps) to a physical simulation box 250, which is optional. At the physical simulation box 250, each of the proposed grasps provided by the grasp optimization box 230 is evaluated in a physical simulation which includes the gripper approaching the part in its particular pose, closing the gripper, lifting the part with the gripper, and moving the part. The physical simulation at the box 250 allows each grasp to be evaluated for its robustness to variables such as gripper collisions, unknown friction values, stability under pose errors and stability with gripper force limits. For example, a grasp which is far from the center of gravity of the part, which induces a large torque at the gripper when the part is lifted, may result in part slippage within the gripper; this grasp may therefore be assigned a lower grasp quality value. The optional physical simulation box 250 offers a way to provide a secondary evaluation of grasp quality, but is not part of the grasp optimization process itself, which is performed in the box 230.

The grasp optimization box 230, the user specifications and preferences 240 and the physical simulation box 250 together make up a grasp generation method 260 according the present disclosure. The output of the grasp generation method 260 is a grasp database 270 including the large number of quality grasps—many hundreds, or 1000 or more. Each grasp in the grasp database 270 is for the specific part and gripper defined by the part model 210 and the gripper model 220. Each grasp in the grasp database 270 includes a grasp quality value, along with an approach direction, target grasp coordinates, and gripper angle and width. The grasps in the grasp database 270 are diverse—including many different grasp locations on the part and many different gripper approach directions.

Figure 3:
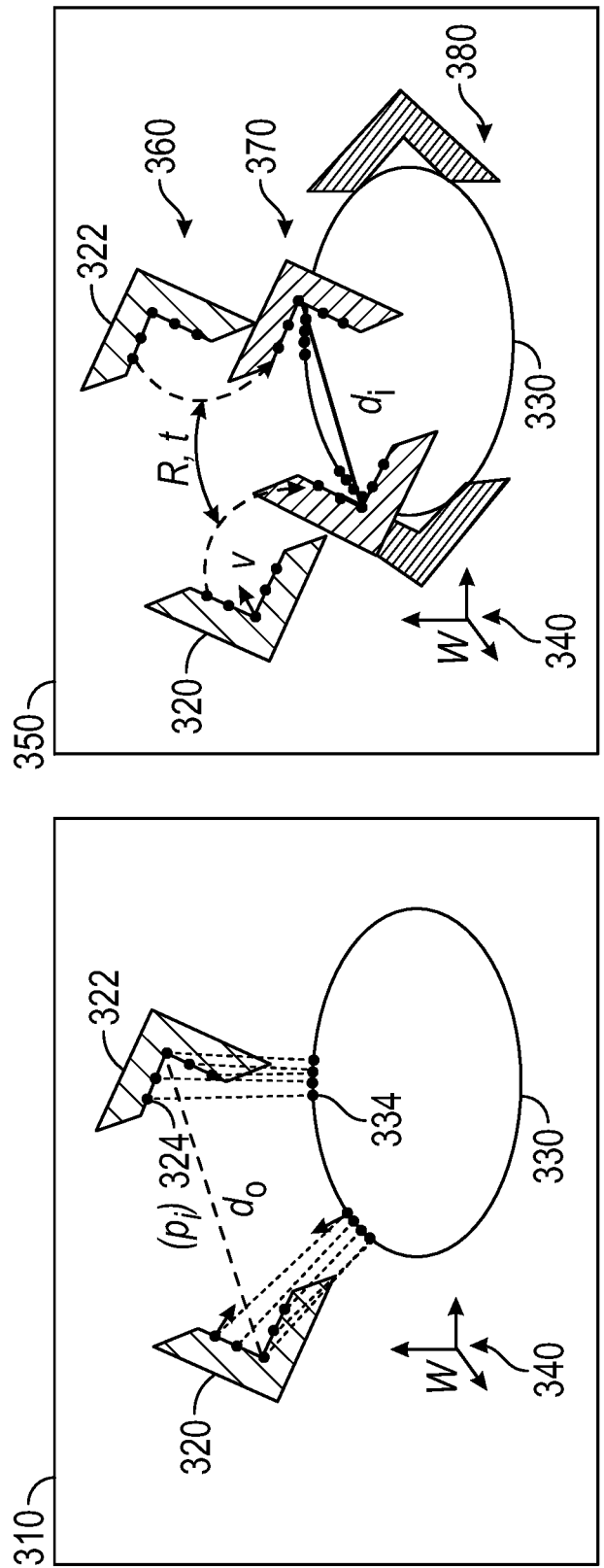
FIG. 3 is an illustration of the basic principles used in a surface fitting algorithm which is employed in the grasp generation process of FIG. 2, according to an embodiment of the present disclosure.

FIG. 3 is an illustration of the basic principles used in a surface fitting algorithm which is employed in the grasp generation process in the box 260 of FIG. 2, according to an embodiment of the present disclosure. Shown in box 310 is an initial configuration of gripper parts 320 and 322 and an object 330 which is to be grasped. The gripper parts 320/322 correspond with the finger tips 224 of the gripper model 220 of FIG. 2, which in turn represent the gripper 120 of FIG. 1. That is, the gripper parts 320/322 may be opened (separated) and closed, and the entire gripper may be translated and rotated, to achieve a best quality grip during optimization computations. The gripper parts 320/322 are separated by a distance $d_0$ at the initial configuration shown in the box 310. The object 330 corresponds with the part model 210 of FIG. 2.

A fixed coordinate frame 340 is defined. The coordinate frame 340 may be defined in any suitable manner—such as a bin coordinate frame which has an origin and orientation defined relative to a corner of the bin 110, for example. The coordinate frame 340 could be defined to be fixed at any location and orientation in the workspace of the robot 100 and the machining station 130 of FIG. 1.

A set of points $p_i$ is defined on the surfaces of the gripper parts 320/322, using any suitable sampling density. The points $p_i$ are defined on any portion of the gripper parts 320/322 (i.e., the finger tips 224 of the gripper model 220) which may contact the object 330 for grasping; this is defined by user selection of triangular patches on the surface of the gripper model 220. One of the sampling points $p_i$ on the gripper part 322 is shown at 324. Sampling points are also defined on the surface of the object 330. FIG. 3 is illustrated as a 2D cross-section for clarity. However, the surfaces of the gripper parts 320/322 and the object 330 are all three dimensional, as are the coordinates of the sampling points $p_i$.

For each of the points $p_i$ (324) on the gripper parts 320/322, a nearest neighbor point 334 on the surface of the object 330 is determined. The nearest neighbor point 334 is determined by computing the shortest 3D distance from the point 324 to a sampling point on the surface of the object 330, in a manner known in the art. From the points $p_i$ on the gripper parts 320/322 and the corresponding nearest neighbor points, an iterative optimization loop is used to update the gripper translation, rotation and opening so that the grasp quality is improved and interference is reduced.

Shown in box 350 are the gripper parts 320/322 and the object 330 at the initial configuration (indicated by arrow 360), an intermediate configuration (indicated by arrow 370), and a final configuration (indicated by arrow 380). The movement of the gripper parts 320/322 in the configurations 360/370/380 depict the behavior of the iterative optimization loop in finding a quality grasp. In the initial configuration 360, there is no grasp contact and no interference between the gripper parts 320/322 and the object 330. Therefore, the position of the gripper parts 320/322 for the next intermediate configuration 370 can be computed by simply moving the points $p_i$ on the gripper parts 320/322 toward their corresponding nearest neighbor points on the object 330. The movement of the gripper parts 320/322 from the initial configuration 360 to the intermediate configuration 370 is defined in terms of a transformation $\mathcal{T}$ including a rotational transformation R, a translational transformation t, and a gripper width transformation q.

From the initial configuration 360 to the intermediate configuration 370, the gripper parts 320/322 have been translated (via t) downward and slightly to the right, and the gripper width has been reduced (via q) from $d_0$ to $d_i$, while very little rotation (R) has been applied. At the intermediate configuration 370, the points $p_i$ on the gripper parts 320/322 are in their new locations, and corresponding nearest neighbor points can be computed accordingly. At the intermediate configuration 370, significant interference exists between the points $p_i$ on the gripper parts 320/322 and the object 330. Thus, the optimization computation will cause the next intermediate configuration (not shown) to apply a transformation $\mathcal{T}$ (especially increasing the gripper width via the transformation q) which attempts to resolve the interference and improve the grip quality. Ultimately, the optimization computation, discussed in detail with respect to FIG. 4, will converge to a locally optimized grasp shown as the final configuration 380. In the final configuration 380, there are no interferences, and multiple parts of the gripper surfaces are in contact with or in proximity to the object 330.

Figure 4:
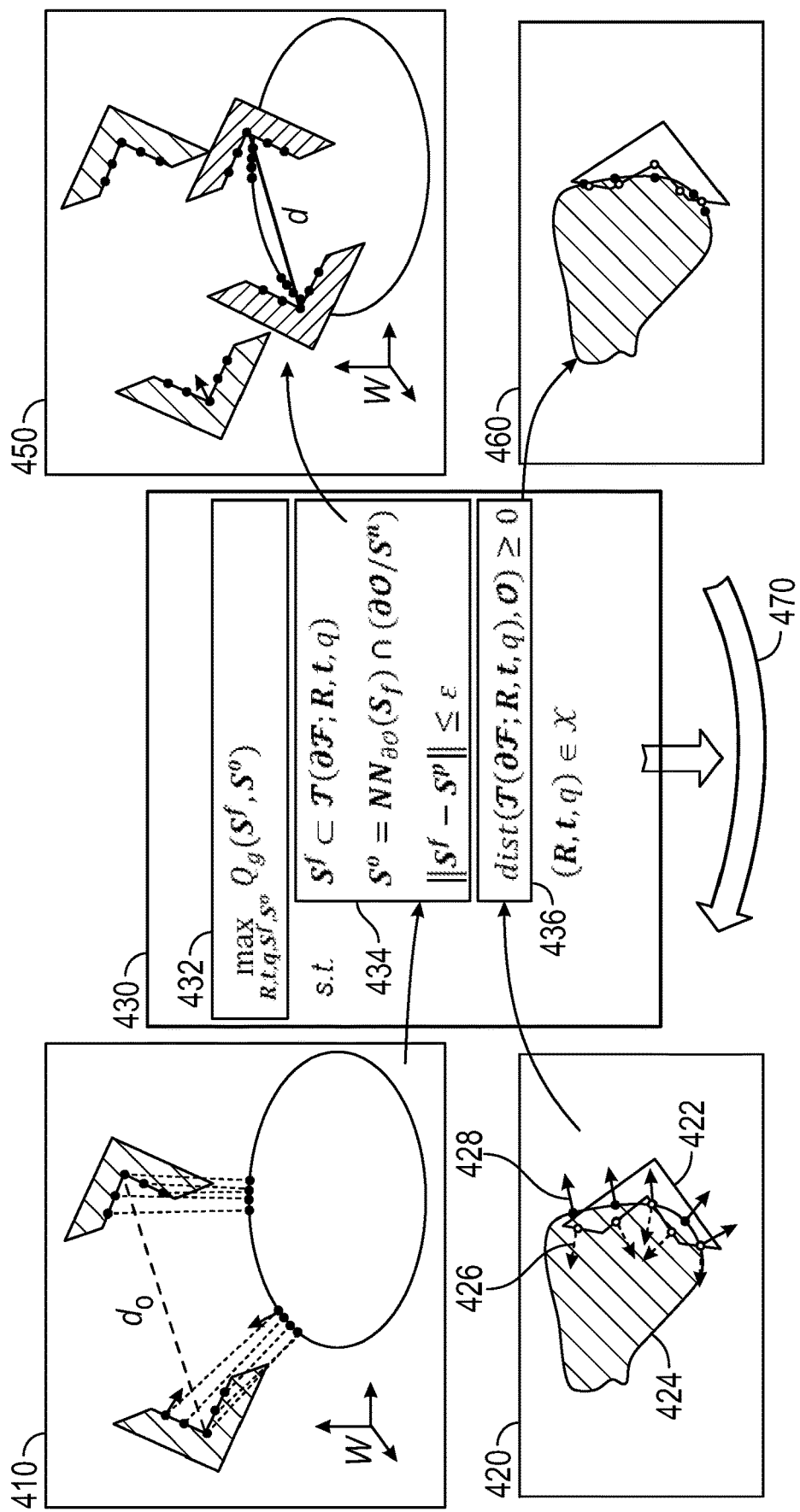
FIG. 4 is an illustration of the grasp optimization computation employed in the grasp generation process of FIG. 2, including surface fitting, collision avoidance and preferred and prohibited grasping regions on the part, according to an embodiment of the present disclosure.

FIG. 4 is an illustration of the grasp optimization computation performed in the box 230 in the grasp generation process of FIG. 2, including surface fitting, collision avoidance and preferred and prohibited grasping regions on the part, according to an embodiment of the present disclosure. At box 410, a configuration of the gripper parts relative to the object is defined, gripper surface points $p_i$ are defined, and corresponding nearest neighbor points on the object are defined. The scene depicted in the box 410 corresponds with the initial configuration box 310 of FIG. 3. Throughout the discussion of the optimization computation, the gripper ("finger") surfaces as defined by the points $p_i$ is referred to as $S^f$, while the object surface (all sampling points, and the nearest neighbor points specifically) is referred to as $S^o$.

Box 420 contains an illustration of how collisions between the gripper ("finger") surface $S^f$ and the object surface $S^o$ are identified. A general mesh of points $p_i$ is applied to the gripper ("finger") surface $S^f$—including inner surfaces of the gripper fingers (the portion of the gripper most commonly used for grasping an object), and also outer surfaces and side surfaces of the gripper fingers, as identified by the user on the gripper model 220. Providing mesh points on all surfaces of the gripper fingers improves the robustness of the collision avoidance constraint, and also allows all surfaces of the gripper fingers to contribute to grasp quality by using those surfaces for contact force when possible (such as for oddly shaped parts). For visual clarity, FIG. 4 again includes 2D illustrations of the gripper and object, collisions and contacts. It is to be understood that the gripper and part models, point coordinates and transformations are all three dimensional in nature.

In the box 420, a gripper part 422 and an object 424 are shown. The object 424 may of course have any general shape, as illustrated. Because the part/object and the gripper were defined by the models 210 and 220 discussed earlier, each of the points on the gripper ("finger") surface $S^f$ and the object surface $S^o$ has a local surface normal, as shown by vectors 426 and 428, respectively. The local surface normal vectors are used both in collision avoidance calculations (where the vectors are used to calculate an amount of penetration of the gripper into the finger, and vice versa, where this penetration or interference is penalized in a constraint function) and in grasp quality calculations (normal forces are present even in the absence of friction; tangential forces are a function of friction coefficient).

In box 430, the grasp searching problem is modeled as an optimization, and one iteration is computed. To compute stable grasps, surface contacts and rigorous mathematic quality are adopted in the modeling. Gripper-object collision is also penalized in the optimization to avoid penetration, as mentioned above. Preferred and prohibited grasp regions on the object are also considered and will be discussed further below. The optimization formulation shown in the box 430 is duplicated below as Equations (1a)-(1f), and is discussed in the following paragraphs.

$$\max_{R,t,q,S^f,S^o} Q_g(S^f, S^o) \tag{1a}$$

$$\text{s.t. } S^f \subset \mathcal{J}(\partial \mathcal{F}; R, t, q) \tag{1b}$$

$$S^o = NN_{\partial O}(S_f) \cap (\partial O / S^n) \tag{1c}$$

$$\|S^f - S^p\| \leq \varepsilon \tag{1d}$$

$$dist(\mathcal{J}(\partial \mathcal{F}; R, t, q), O) \geq 0 \tag{1e}$$

$$(R, t, q) \in X \tag{1f}$$

The optimization formulation includes an objective function (Eq. 1a) in box 432 which is defined to maximize grasp quality $Q_g$, where the grasp quality $Q_g$ is a function of the contact surfaces $S^f$ and $S^o$. The grasp quality $Q_g$ may be defined in any suitable manner. In a representative embodiment, the grasp quality $Q_g$ is the negative of the total distance between the points $p_i$ on the gripper finger surface $S^f$ and the matched nearest neighbor points NN on the object surface $S^o$. That is, $Q_g = -\Sigma_{p_i} \|p_i - NN\|$, where a smaller total sum of the distances results in a larger grasp quality $Q_g$, which means a better surface fit between the gripper and the object. In other words, a good quality grasp has a small negative value of $Q_g$, and a poor quality grasp has a large negative value of $Q_g$. In practical terms, a good quality grasp is stable, where any minor movement of the object in the gripper is quickly stopped by friction and/or normal forces and does not lead to a loss of grip.

The optimization formulation of Equations (1a)-(1f) includes many constraint functions in box 434. A constraint function (Eq. 1 b) defines the gripper finger surface $S^f$ in terms of the transformations (R,t,q). A constraint function (Eq. 1c) defines the object surface $S^o$ in terms of the nearest neighbor points NN in relation to the gripper finger surface $S^f$, while avoiding prohibited grasp regions on the object which are labelled $S^n$. A constraint function (Eq. 1d) requires the overall total distance from the gripper finger surface $S^f$ to preferred grasp regions on the object ($S^p$) to be less than a threshold value E, which "attracts" the gripper to the preferred grasp regions on the object. The prohibited grasp regions on the object ($S^n$) and the preferred grasp regions on the object ($S^p$) are defined by the user (at the box 240 of FIG. 2) by identifying triangular patches on the surface of the object, in a manner similar to the identification of gripper surfaces discussed earlier.

The constraint functions in the box 434 (Equations 1 b, 1 c and 1d) collectively lead to better surface fitting of the gripper (finger) surface $S^f$ to the object surface $S^o$, including moving the points $p_i$ toward their nearest neighbors, causing the gripper surface $S^f$ to avoid the prohibited grasp regions $S^n$ on the object, and causing the gripper surface $S^f$ to be attracted to the preferred grasp regions $S^p$ on the object. This is shown in box 450, which corresponds with the box 350 of FIG. 3. That is, the transformations determined from the constraint functions in the box 434 cause the gripper fingers to move toward an improved surface fitting condition.

A constraint function (Eq. 1 e) in box 436 dictates that the transformed gripper finger surface ($\mathcal{T}$ ($\partial \mathcal{F}$ ; R,t,q)) should not penetrate the object $\mathcal{O}$; that is, the distance should be greater than or equal to zero. This constraint in the box 436 leads to improved collision avoidance in the next iteration, as shown in box 460. Finally, Equation (1f) indicates that the transformations $\mathcal{T}$ (R,t,q) are elements of the feasible set X of transformations (in one embodiment, R may have any rotational value, t must be within a bounding box size of the object, and q is limited by the grasp range defined in the gripper model 220).

The constraint functions of Equations (1b)-(1e) described above (in the boxes 434 and 436 of FIG. 4) are considered by penalty methods, where the constraint violations are treated as a cost function in the grasp quality calculation. That is, the greater the constraint violations, the larger the cost function, and the smaller the grasp quality. By placing constraints into costs against grasp quality, the optimization formulation shown in the box 430 can be solved by least squares.

A one-step least square linear algebra computation is performed on the optimization equations in the box 430 to identify the transformations $\mathcal{T}$ (R,t,q) which move the gripper fingers in a direction of improved grasp quality while satisfying the constraint functions. Arrow 470 shows that, after calculation of the transformations $\mathcal{T}$, the grasp optimization method returns to the box 410 (where the position of the transformed gripper parts relative to the object is determined, and nearest neighbor points on the object corresponding to the gripper surface points $p_i$ are defined) and the box 420 (collisions identified). This process is repeated until the grasp position converges to a local maximum grasp quality.

After convergence to a quality grasp, the process is started over again with a new initial configuration, and this is repeated until the user-defined number of grasps (e.g., 1000) is reached. The initial configuration of the gripper parts with respect to the object, shown in the box 310 of FIG. 3 and the box 410 of FIG. 4, is varied randomly for each new grasp computation cycle, so that a diverse set of grasp locations and grasp approach orientations is obtained. That is, for the pipe valve part, many grasps on the handle are computed (from many different approach directions), many grasps on the coupling body portion, many grasps on the valve throat portion, etc. This diversity of grasps ensures that quality grasps can be identified on parts in the bin 110 regardless of what poses the individual parts are in. All of the quality grasps computed in this way are placed into the grasp database 230 (FIG. 2).

Figure 5:
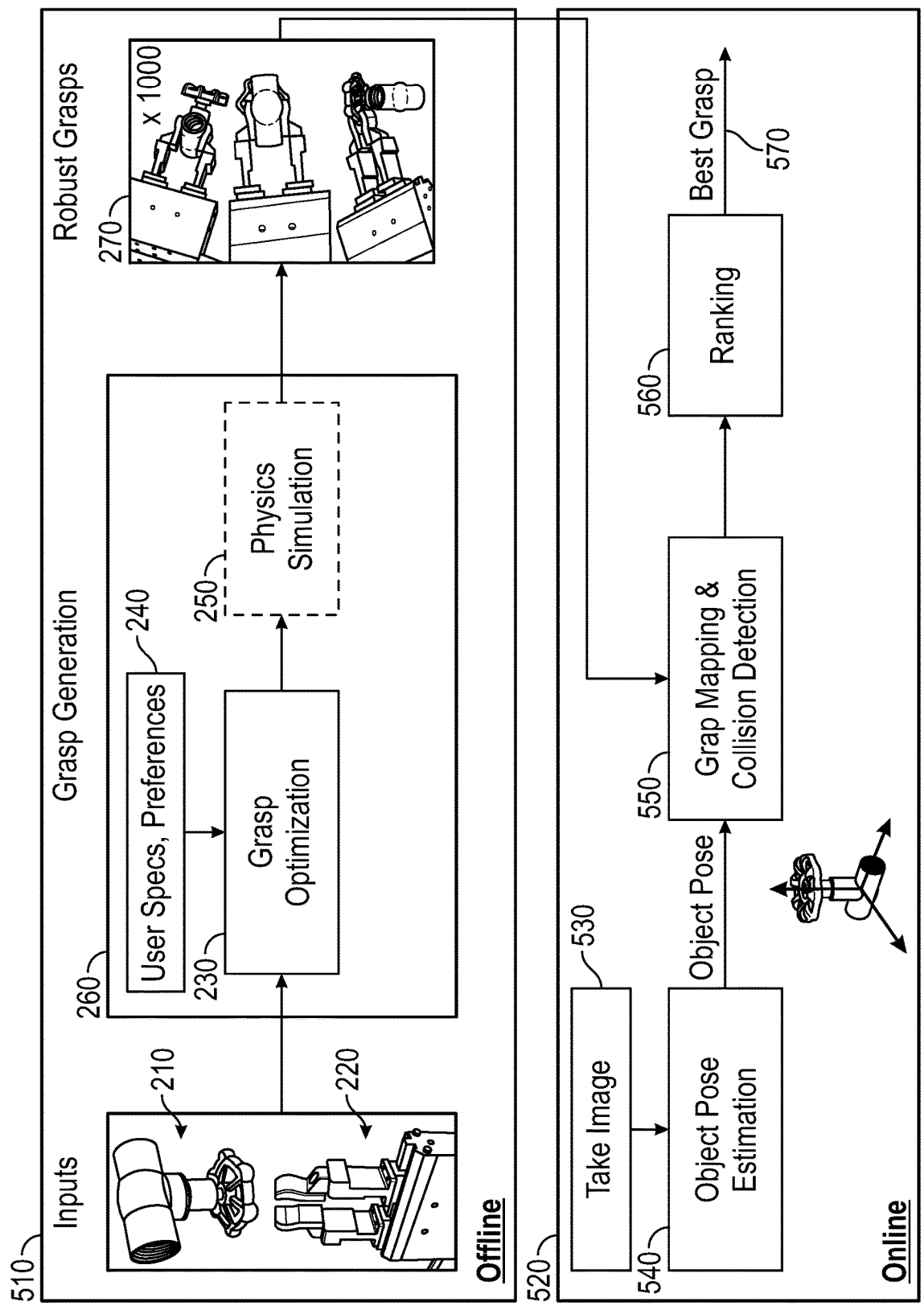
FIG. 5 is an illustrated flowchart diagram of steps used by the machine tending system of FIG. 1, including using the grasp database from FIG. 4 to identify a target grasp of a part from the bin, according to an embodiment of the present disclosure.

FIG. 5 is an illustrated flowchart diagram of steps used by the machine tending system of FIG. 1, including using the grasp database to identify a target grasp of a part from the bin, according to an embodiment of the present disclosure. Box 510 includes the steps of the grasp generation method shown in the illustrated flowchart diagram of FIG. 2. This includes providing the part model 210 and the gripper model 220, along with the user specifications and preferences 240, as inputs to the grasp optimization method in the box 230. The grasp optimization method was described in detail with respect to FIG. 4. After the optional physical simulation at the box 250, the quality grasps are output to the grasp database 270.

The grasp database generation in the box 510 is performed in an "offline" mode, in advance of actual robotic machine tending operations. The grasp database generation does not require a robot, a vision system or a machining station, and is typically done by a computer other than a robot controller, such as the computer 160 of FIG. 1.

Box 520 includes the steps performed during actual "online" robotic machine tending operations, as shown in FIG. 1. The steps of the box 520 may be performed on the controller 150 of FIG. 1, or on the computer 160. At box 530, an image of the bin 110 is taken by the 3D camera(s) 170. The bin 110 contains one or more of the parts defined by the part model 210. The image or images from the box 530 are provided to an object pose estimation box 540, where a 3D matching technique is used to estimate the pose of the one or more parts in the bin 110. Pixel depth values are used to define a cloud of points for each part located in the images, and the shape defined by the cloud of points is matched to a particular pose of the part model 210 provided as input in FIG. 2. For example, one part may be situated with the top surface of the handle facing down onto the bottom of the bin 110 with the coupling body oriented at a certain angle, while several other parts may be resting on their side in the bin 110 with the coupling bodies each oriented in a different directions, etc. For each part in the bin 110, the pose estimation at the box 540 results in a copy of the part model 210 placed in a particular position and orientation.

The object pose data (for one or more parts in the bin 110) is provided to a grasp mapping and collision detection box 550. The grasp database 270 is also provided to the box 550, as shown. The grasp mapping and collision detection box 550 identifies a target grasp of one of the parts in the bin 110 based on the object pose data and the grasp database 270. This determination includes consideration of the gripper's ability to make a collision-free approach to grasp the part. For example, a part which has one or more other parts piled on top of or around it will likely not be available to grasp. Likewise, a part which is located up against a side of the bin 110 may be difficult to grasp. For parts which are positioned "in the clear" in the bin 110, it is straightforward to map a high quality grasp from the database 270 onto the part model contained in the object pose data.

Several quality grasps may be identified for each part, and several parts may be included in the object pose data. Thus, the box 550 may output many candidate parts and grasps. The candidate parts and grasps from the box 550 are provided to a ranking box 560, where a best quality grasp is identified. The ranking box 560 may simply select the grasp with the highest quality value, or may consider other factors as well. The best grasp, or target grasp, is output on a line 570, where it is used by the robot controller 150 to cause the robot 100 to grasp the part as defined by the target grasp. The robot 100 then loads the part into the machining station 130 as discussed earlier. Because the grasp optimization process (FIG. 4) allows for consideration of preferred and prohibited grasping regions on the part, the robot 100 can be assured of grasping the part such that the part can be placed into the grasping tool of the machining station 130.

The grasp generation technique shown in FIGS. 2-4 has been demonstrated on a variety of real-world parts to produce a high quality grasp database—including a wide diversity of grasp locations on the part and grasp approach directions, while meeting the preferred and prohibited grasp region requirements defined by the user. The computed grasp database has also been demonstrated to enable quick and effective grasp identification in a robotic grasping system of the type shown in FIG. 1, using the method of the box 520 of FIG. 5.

The grasp generation technique discussed above offers several advantages over existing methods. The disclosed methods provide high quality, full-DOF grasps with surface contacts; thus the generated grasps are more robust to uncertainties and disturbances. The grasp generation method is easy to run, and runs automatically in an offline environment not requiring a robot and vision system. In addition, the disclosed methods generate diverse grasp data including many different grasp locations and approach directions. Finally, the disclosed grasp generation method allows for preferred and prohibited grasp regions to be defined on the part, which satisfies the requirement of machine tending applications where the part must be handed off from the robot to another grasping tool (in the machining station).

Throughout the preceding discussion, various computers and controllers are described and implied. It is to be understood that the software applications and modules of these computers and controllers are executed on one or more computing devices having a processor and a memory module. In particular, this includes a processor in the robot controller 150 which controls the robot 100 performing the object grasping, and in the computer 160 which performs the grasp generation computations. As discussed earlier, either the controller 150 or the computer 160 may be configured to identify objects for grasping in real time operations.

While a number of exemplary aspects and embodiments of the optimization-based grasp generation technique for machine tending have been discussed above, those of skill in the art will recognize modifications, permutations, additions and sub-combinations thereof. It is therefore intended that the following appended claims and claims hereafter introduced are interpreted to include all such modifications, permutations, additions and sub-combinations as are within their true spirit and scope.

What is claimed is:

1. A method for generating a grasp database for use by a robotic grasping system, said method comprising:
providing an object model including three-dimensional (3D) shape data for an object to be grasped, and a gripper model including 3D shape data and actuation parameters for a gripper;
receiving user specifications including a number of grasps to compute, and definition of preferred grasp regions on the object, prohibited grasp regions on the object, or both;
repeatedly performing an iterative optimization, using a computer having a processor and memory, where each optimization converges to a locally-optimum quality grasp while satisfying constraint equations which define surface contact without interference between the gripper and the object, avoid the prohibited grasp regions on the object and attract to the preferred grasp regions on the object; and
outputting data defining each of the quality grasps to the grasp database.

2. The method according to claim 1 wherein repeatedly performing an iterative optimization includes randomly initializing a gripper position relative to the object for a first iteration of the optimization for each of the number of grasps to compute.

3. The method according to claim 1 further comprising using the grasp database during live robotic operations to identify a target object to grasp from a container of objects, including estimating object poses by comparing depth images from a 3D camera to the object model, identifying the target object by mapping grasps from the grasp database onto the estimated object poses, and providing target object grasp data to a robot controller which instructs a robot fitted with the gripper to grasp and move the target object into a machining station which grasps the target object at a location not used for grasping by the robot.

4. The method according to claim 1 further comprising performing a physical simulation of object grasping for each of the quality grasps, including simulating the gripper grasping and moving the object under variable conditions of interference, pose estimation error, friction and force limits, and only outputting data to the grasp database for physical simulations which predict a stable grasp.

5. The method according to claim 1 wherein the data defining each of the quality grasps includes 3D coordinates of a grasp target point, an angle of approach to be followed by the gripper, a gripper angle of rotation, a gripper width and a grasp quality value.

6. The method according to claim 1 wherein the iterative optimization is formulated including a gripper surface defined in terms of sampling points on surfaces of the gripper model, and an object surface defined in terms of sampling points on surfaces of the object model, including a nearest neighbor point on the object surface corresponding with each of the sampling points on the gripper surface.

7. The method according to claim 6 wherein the gripper surface is transformed at each iteration by a transformation including a rotation, a translation and a change in gripper width.

8. The method according to claim 7 wherein the iterative optimization is formulated including an objective function which maximizes a grasp quality defined based on a total distance between each sampling point on the gripper surface and its corresponding nearest neighbor point on the object surface, where the constraint equations are treated as penalty functions whereby constraint violations reduce the grasp quality, and each iteration computes the transformation in one step using a least square linear algebra computation.

9. The method according to claim 6 wherein the iterative optimization is formulated including a constraint equation which specifies that the gripper surface does not penetrate the object surface.

10. The method according to claim 6 wherein the iterative optimization is formulated including an equation which specifies that the nearest neighbor points on the object surface are not located in the prohibited grasp regions, and an equation which specifies that a distance between the gripper surface and the preferred grasp regions is less than a predefined threshold.

11. A method for computing an object grasp for a machine tending robot, said method comprising:

generating a grasp database, including providing an object model including three-dimensional (3D) shape data for an object to be grasped and a gripper model including 3D shape data and actuation parameters for a gripper, receiving user specifications including definition of preferred grasp regions on the object and prohibited grasp regions on the object, and repeatedly performing an iterative optimization, using a computer having a processor and memory, where each optimization converges to a locally-optimum quality grasp while satisfying constraint equations which define surface contact without interference between the gripper and the object, avoid the prohibited grasp regions on the object and attract to the preferred grasp regions on the object, where data defining each of the quality grasps is output to the grasp database; and using the grasp database during live robotic operations to identify a target object to grasp from a container of objects, including estimating object poses by comparing depth images from a 3D camera to the object model, identifying the target object by mapping grasps from the grasp database onto the estimated object poses, and providing target object grasp data to a robot controller which instructs a robot fitted with the gripper to grasp and move the target object into a machining station which grasps the target object at a location not used for grasping by the robot.

12. A robotic grasp generation system comprising:

a computer having a processor and memory, said computer configured to generate a grasp database, including;

providing an object model including three-dimensional (3D) shape data for an object to be grasped, and a gripper model including 3D shape data and actuation parameters for a gripper, receiving user specifications including a number of grasps to compute, and definition of preferred grasp regions on the object, prohibited grasp regions on the object, or both, repeatedly performing an iterative optimization, where each optimization converges to a locally-optimum quality grasp while satisfying constraint equations which define surface contact without interference between the gripper and the object, avoid the prohibited grasp regions on the object and attract to the preferred grasp regions on the object, and outputting data defining each of the quality grasps to the grasp database.

13. The system according to claim 12 further comprising:

a 3D camera providing depth images to the computer of a container of objects during live robotic operations, where the computer identifies a target object to grasp from the container of objects, including estimating object poses by comparing the depth images to the object model, and identifying the target object by mapping grasps from the grasp database onto the estimated object poses;

a robot controller in communication with the computer and receiving grasp data about the target object; and a robot fitted with the gripper to grasp and move the target object based on commands from the controller.

14. The system according to claim 13 wherein the robot grasps and moves the target object into a machining station which grasps the target object at a location not used for grasping by the robot.

15. The system according to claim 12 wherein repeatedly performing an iterative optimization includes randomly initializing a gripper position relative to the object for a first iteration of the optimization for each of the number of grasps to compute.

16. The system according to claim 12 wherein the computer is further configured to perform a physical simulation of object grasping for each of the quality grasps, including simulating the gripper grasping and moving the object under variable conditions of interference, pose estimation error, friction and force limits, and only outputting data to the grasp database for physical simulations which predict a stable grasp.

17. The system according to claim 12 wherein the data defining each of the quality grasps includes 3D coordinates of a grasp target point, an angle of approach to be followed by the gripper, a gripper angle of rotation, a gripper width and a grasp quality value.

18. The system according to claim 12 wherein the iterative optimization is formulated including a gripper surface defined in terms of sampling points on surfaces of the gripper model, and an object surface defined in terms of sampling points on surfaces of the object model, including a nearest neighbor point on the object surface corresponding with each of the sampling points on the gripper surface.

19. The system according to claim 18 wherein the gripper surface is transformed at each iteration by a transformation including a rotation, a translation and a change in gripper width.

20. The system according to claim 18 wherein the iterative optimization is formulated including an objective function which maximizes a grasp quality defined based on a total distance between each sampling point on the gripper surface and its corresponding nearest neighbor point on the object surface, where the constraint equations are treated as penalty functions whereby constraint violations reduce the grasp quality.

21. The system according to claim 18 wherein the iterative optimization is formulated including a constraint equation which specifies that the gripper surface does not penetrate the object surface.

22. The system according to claim 18 wherein the iterative optimization is formulated including an equation which specifies that the nearest neighbor points on the object surface are not located in the prohibited grasp regions, and an equation which specifies that a distance between the gripper surface and the preferred grasp regions is less than a predefined threshold.

* * * * *